Patented June 2, 1936

2,042,741

UNITED STATES PATENT OFFICE 2,042,741

SYNTHETIC RESINS AND PROCESS OF MAKING SAME

Theodor Sutter, Basel, Switzerland, assignor to the firm of Society of Chemical Industry in Basle, Basel, Switzerland No Drawing. Application March 29, 1934, Serial No. 718,080. In Switzerland March 29, 1933

16 Claims. (Cl. 260—3)

The outstanding electrical and mechanical properties of certain groups of condensation products derived from aromatic amines and aldehydes have been disclosed in a number of patent specifications and have induced use of these resins in the arts of insulation and the production of synthetic resinous products. It has not been possible hitherto however to combine these resins with drying oils and thereby to make their valuable properties available in the lacquer and varnish industries.

According to this invention soluble resins capable of being hardened and suitable for the manufacture of varnishes, coatings and synthetic resinous products are obtained when a drying oil, such as China wood-oil, linseed-oil, hempoil, perilla-oil or the like, or a derivative thereof such as can be made by esterification, aeration or boiling or the like, is united with a bi-nuclear or poly-nuclear aromatic amine base whose nuclei are connected directly or indirectly by one or more methylene groups. The term "poly-nuclear" is used herein to include the bi-nuclear compounds as well as those of more complex structure. The reaction product is subsequently treated with an aldehyde.

The process may start from a previously formed methylene base obtained by condensing a primary aromatic amine with formaldehyde, preferably in presence of an acid catalyst, and which is condensed with the drying oil preferably in presence of a solvent and a condensing agent, such as hydrochloric acid, phosphoric acid, phosphorus chloride, boric acid etc.; or the formation of the methylene base may occur in the course of the process, for example as the parent material, the condensation product of the drying oil with the aromatic amine, for instance aniline and its homologues, naphthylamine and the like may be used, the amino-residue of which can then be connected in known manner with further aromatic amines by means of methylene groups. Particularly suitable for this purpose is the process of U. S. Patent 1,999,069 in which amine bases containing active methylene groups, for instance anhydroformaldehydeaniline and its homologues or anhydro-para-aminobenzylalcohol and its derivatives may be caused to react with the condensation product of the drying oil and the amine, preferably in presence of an acid condensing agent, rather than with the amine itself. The proportion of the oil component to the amine component may be varied within wide limits thereby varying the properties of the product, since the coupling capacity of the active methylene bases is practically unlimited. Very similar products are also obtained when, for example, a condensate from aniline and China wood-oil is treated with further quantities of aniline in presence of formaldehyde or when the condensation product from China wood-oil and anhydroformaldehyde-aniline is condensed with amine.

The compounds obtained in this manner or in similar manner from methylene bases and drying oils are viscid to resinous and freely soluble in many solvents of low boiling point but are not capable of being hardened by heat. They are then condensed under very various conditions, preferably in solution and in presence of an acid catalyst, with aldehydes, for example formaldehyde, furfural, acrolein and the like, which may be used in the free condition or in the form of an agent that yields aldehyde such as hexamethylenetetramine. These new products are soluble in various solvents for instance benzene, toluene, xylene, benzene-alcohol, cyclohexanone or the like. In solution they may be mixed with lacquer bases and plasticizers and may be dried in the presence of siccatives very quickly to obtain clear extraordinarily adherent, tough and elastic films which become, by heat treatment, insoluble, very hard and very resistant to mechanical and chemical agencies. When mixed with filling agents the new resins may be converted by pressure and heat into valuable synthetic resinous products.

The new resins may be employed in coating or impregnating paper or fabric sheets and are therefore suitable also for use as binding agents for making laminated products.

The term "a modified drying oil" is meant to signify a drying oil modified by boiling, aerating or replacing the glycerol by other suitable organic hydroxy-compounds, such as ethyl alcohol, glycol, and so on.

In order to give a clear understanding of the novel features of the process, I illustrate the same by the following examples in which, as will appear, a total amount of aldehyde—including the formaldehyde yet present in the intermediate product—of at least one molecular proportion to one amino group is employed.

Example 1

400 parts of China wood-oil, 250 parts of aniline and 10 parts of anilinehydrochloride are together boiled in a reflux apparatus. Correspondingly with the progressive combination of the aniline, the boiling point rises from about 190° C. to 220–230° C. in the course of 3–6 hours. There is produced an oil which is thick when cold and from which, by steam distillation, only a very small quantity of aniline can be recovered.

There are now introduced into the mass at about 150° C. 300 parts of anhydroformaldehydeaniline; the latter quickly thaws and the whole is heated for 1–2 hours at 200° C. and then allowed to cool. The product is viscid to solid and is freely soluble in alcohol-benzene. For treatment with formaldehyde, it is preferably dissolved in 4–6 times its weight of this solvent and the solution is allowed to run, whilst stirring well and cooling, into 500 parts of formaldehyde of 40 per cent. strength contained in a reflux apparatus; reaction occurs with considerable evolution of heat. After boiling for about 1 hour the aqueous layer is separated and the residue washed several times with water, or the resin solution is freed from adhering acid by stirring it with solid anhydrous sodium carbonate. By distilling the solvent, preferably under diminished pressure, there is obtained a viscid resin which is solid when cold but is soluble in benzene, toluene and other benzene hydrocarbons as well as the mixtures thereof with alcohols; it forms rapidly drying, very firmly adherent, hard coatings which, by heat treatment, become harder and more resistant as well as insoluble. The addition of one of the usual drying agents (siccative) hastens the drying.

The quantities of the materials as above set forth correspond to a ratio of aldehyde to amine equal to about 1.7:1.

Example 2

100 parts of China wood-oil, 30 parts of diamino-diphenylmethane and 30 parts of methyl-cyclohexanone as solvent are mixed with 2 parts of phosphorus trichloride and the whole is boiled for 3 hours in a reflux apparatus; after cooling the thick oil is mixed with 50 parts of anhydroformaldehydeaniline and 20 parts of glacial acetic acid and the mixture is heated for 2 hours to about 120° C. After cooling the mass is dissolved in alcohol-benzene and the solution is treated as described in Example 1 with 100 parts of formaldehyde of 40 per cent. strength. The resin is particularly easily soluble in alcohol-benzene, the solution yielding coatings similar to those obtained with the body made by Example 1.

The quantities of materials used in this example correspond to a ratio of adehyde to amine equal to about 2.5:1.

Example 3

150 parts of linseed-oil, 100 parts of aniline and 5 parts of phosphorus trichloride are heated together to boiling for some hours in a reflux apparatus; after cooling 150 parts of anhydroformaldehydeaniline and 10 parts of phthalic acid are introduced at about 100° C. and the whole is heated for 1 hour at 140° C. The mass is then dissolved as described in Example 1 with alcohol-benzene and the solution is treated with 160 parts of formaldehyde of 40 per cent. strength; the properties of the product correspond with those of the resins described above.

The quantities of materials used in this example correspond to a ratio of aldehyde to amine equal to about 1.4:1.

Example 4

200 parts of the ethyl-ester of China wood-oil acids obtained in known manner by esterification of China wood-oil in alcohol, 120 parts of aniline and 4 parts of phosphoric acid are together boiled for 4 hours, whereby the boiling point rises from 190–234° C. The mass is allowed to cool to about 150° C. and there are introduced while stirring 200 parts of anhydroformaldehydeaniline, the same temperature being maintained for a long while. There are then introduced, whilst stirring well and in small portions, 120 parts of para-formaldehyde which dissolves while foaming; the resin is similar to those described above.

The quantities of materials used in this example correspond to a ratio of aldehyde to amine equal to about 1.84:1.

Example 5

50 parts of the resin made as described in Example 1 by condensing China wood-oil first with aniline and then with anhydroformaldehydeaniline are dissolved in benzene and the solution is mixed with 35 parts of furfural. Preferably the solution is boiled for some time in a reflux apparatus; when dried it leaves a reddish-brown adherent coating which, by treatment at 120–150° C., becomes insoluble and very hard.

The quantities of materials used in this example correspond to a ratio of aldehyde to amine equal to about 1.52 to 1.

What I claim is:—

1. In the process of manufacturing condensation products from a drying oil, a primary aromatic amine and formaldehyde, the step of treating the product of reaction with an amount of an aldehyde securing an aldehyde content of at least 1 molecular proportion of aldehyde to each amino group.

2. In the process of manufacturing condensation products from drying oil, a primary aromatic amine, and formaldehyde, the steps of condensing a primary aromatic amine with formaldehyde and subjecting this product together with a drying oil to heat to cause a reaction therebetween, and treating the product of the reaction with an amount of an aldehyde securing an aldehyde content of at least one molecular proportion of aldehyde to each amino group.

3. In the process of manufacturing condensation products from drying oil, a primary aromatic amine, and formaldehyde, the steps of condensing a primary aromatic amine with formaldehyde and subjecting this product together with a drying oil to heat to cause a reaction therebetween, reacting the compound with a condensation product of formaldehyde and a primary aromatic amine of the type of methylene aniline in presence of an acid catalyst, and treating the product of the reaction with an amount of an aldehyde securing an aldehyde content of at least one molecular proportion of aldehyde to each amino group.

4. In the process of manufacturing condensation products from drying oil, a primary aromatic amine and formaldehyde, the steps of condensing aniline with formaldehyde and subjecting this product together with China wood-oil to heat to cause a reaction therebetween, and treating the product of the reaction with an amount of formaldehyde securing an aldehyde content of at least one molecular proportion of aldehyde to each amino group.

5. In the process of manufacturing condensation products from drying oil, a primary aromatic amine, and formaldehyde, the steps of condensing a primary aromatic amine with formaldehyde and subjecting this product together with a drying oil, in presence of an acid catalyst, to heat to cause a reaction therebeween, and treating the product of the reaction with an amount of an aldehyde securing an aldehyde content of at least one molecular proportion of aldehyde to each amine group.

6. In the process of manufacturing condensation products from drying oil, a primary aromatic amine, and formaldehyde, the steps of condensing a primary aromatic amine with formaldehyde and subjecting this product together with a drying oil, to heat to cause a reaction therebetween, and treating the product of the reaction in presence of an acid catalyst with an amount of an aldehyde securing an aldehyde content of at least one molecular proportion of aldehyde to each amino group.

7. In the process of manufacturing condensation products from drying oil, a primary aromatic amine, and formaldehyde, the steps of condensing a primary aromatic amine with formaldehyde and subjecting this product together with a drying oil, to heat to cause a reaction therebetween, and treating the product of the reaction in solution with an amount of an aldehyde securing an aldehyde content of at least one molecular proportion of aldehyde to each amino group.

8. In the process of manufacturing condensation products from drying oil, a primary aromatic amine, and formaldehyde, the steps of forming the condensation product of a primary aromatic amine and formaldehyde in presence of a drying oil, subjecting the mixture to heat to cause a reaction therebetween, and treating the product of the reaction with an amount of an aldehyde securing an aldehyde content of at least one molecular proportion of aldehyde to each amino group.

9. In the process of manufacturing condensation products from drying oil, a primary aromatic amine, and formaldehyde, the steps of forming the condensation product of a primary aromatic amine and formaldehyde in presence of a drying oil, subjecting the mixture to a temperature of about 230° C. to cause a reaction therebetween, and treating the product of the reaction with an amount of an aldehyde securing an aldehyde content of at least one molecular proportion of aldehyde to each amino group.

10. In the process of manufacturing condensation products from drying oil, a primary aromatic amine, and formaldehyde, the step of reacting the condensation product obtained by heating a drying oil and a primary aromatic amine with a condensation product of formaldehyde and a primary aromatic amine of the type of methylene-aniline in presence of an acid catalyst, and treating the product of the reaction with an amount of an aldehyde securing an aldehyde content of at least one molecular proportion of aldehyde to each amino group.

11. In the process of manufacturing condensation products from drying oil, a primary aromatic amine, and formaldehyde, the step of reacting the condensation product obtained by heating China-wood oil and aniline to a temperature of about 230° C. with a condensation product of formaldehyde and a primary aromatic amine of the type of methylene-aniline in presence of an acid catalyst at a temperature of about 200° C., and treating the product of the reaction with an amount of an aldehyde securing an aldehyde content of at least one molecular proportion of aldehyde to each amino group.

12. In the process of manufacturing condensation products from drying oil, a primary aromatic amine, and formaldehyde, the step of reacting the condensation product obtained by heating a drying oil and a primary aromatic amine with a condensation product of formaldehyde and a primary aromatic amine of the type of methylene-aniline in presence of phthalic acid, and treating the product of the reaction with an amount of an aldehyde securing an aldehyde content of at least one molecular proportion of aldehyde to each amino group.

13. In the process of manufacturing condensation products from drying oil, a primary aromatic amine, and formaldehyde, the step of reacting the condensation product obtained by heating a drying oil and a primary aromatic amine with a condensation product of formaldehyde and a primary aromatic amine of the type of methylene-aniline in presence of an acid catalyst in solution, and treating the product of the reaction with an amount of an aldehyde securing an aldehyde content of at least one molecular proportion of aldehyde to each amino group.

14. In the process of manufacturing condensation products from drying oil, a primary aromatic amine, and formaldehyde, the steps of condensing a primary aromatic amine with formaldehyde and subjecting this product together with a drying oil, in the presence of an acid catalyst to heat to cause a reaction therebetween, and treating the product of the reaction with an amount of an aldehyde securing an aldehyde content of at least one molecular proportion of aldehyde to each amino group and eliminating the acid.

15. In the process of manufacturing condensation products from drying oil, a primary aromatic amine, and formaldehyde, the step of reacting the condensation product obtained by heating a drying oil and a primary aromatic amine with a condensation product of formaldehyde and a primary aromatic amine of the type of methylene-aniline in presence of an acid catalyst, the said condensation product being formed during the process by interaction of a primary aromatic amine with formaldehyde, and treating the product of the reaction with an amount of an aldehyde securing an aldehyde content of at least one molecular proportion of aldehyde to each amino group.

16. In the process of manufacturing condensation products from drying oil, a primary aromatic amine, and formaldehyde, the step of reacting the condensation product obtained by heating a drying oil and a primary aromatic amine with a condensation product of formaldehyde and a primary aromatic amine of the type of methylene-aniline in presence of an acid catalyst, and treating the product of the reaction with an amount of an aldehyde securing an aldehyde content of at least one molecular proportion of aldehyde to each amino group and eliminating the acid.

THEODOR SUTTER.